United States Patent [19]

Siegel et al.

[11] Patent Number: 4,714,665
[45] Date of Patent: Dec. 22, 1987

[54] SECONDARY BATTERY

[75] Inventors: Sanford A. Siegel, Baton Rouge; Stephen A. Noding, Brusly, both of La.

[73] Assignee: The Dow Chemical Company, Midland, Mich.

[21] Appl. No.: 945,918

[22] Filed: Dec. 23, 1986

[51] Int. Cl.$^4$ .............................................. H01M 4/60
[52] U.S. Cl. .................................... 429/192; 429/213; 429/199
[58] Field of Search ................ 429/213, 188, 191, 192, 429/199, 127

[56] References Cited

U.S. PATENT DOCUMENTS

| 4,321,114 | 3/1982 | MacDiarmid et al. | 429/213 X |
| 4,556,614 | 12/1985 | Mehaute et al. | 429/191 |
| 4,559,284 | 12/1985 | Nishimura et al. | 429/213 |
| 4,614,695 | 9/1986 | Ibbott | 429/127 |
| 4,620,026 | 10/1986 | Siegel | 560/85 |
| 4,664,991 | 5/1987 | Perichaud et al. | 429/213 X |
| 4,668,596 | 5/1987 | Shacklette et al. | 429/194 |

FOREIGN PATENT DOCUMENTS 84107618.5 1/1985 European Pat. Off. .

Primary Examiner—Anthony Skapars
Attorney, Agent, or Firm—E. E. Spielman; D. R. Howard

[57] ABSTRACT

This invention relates to a secondary battery comprised of three polymer films, the third containing an electrolyte and the first and second containing an electrochemical species which may be in an anodic or a cathodic state depending upon whether the battery is discharging or is being recharged. The third polymer sheet is substantially not electrically conductive under battery discharge voltages, but is electrically conductive under battery recharge voltages. The first and second sheets are electrically conductive under both the discharge and recharge voltages. In a preferred form, the electrolyte and the electrochemical species are uniformly distributed within their respective films by dissolving the electrolyte and the species in a plasticizer which is incorporated within the polymer films.

20 Claims, 2 Drawing Figures

SECONDARY BATTERY

BACKGROUND OF THE INVENTION

This invention relates to a secondary battery comprised of three polymer film sheets. One sheet contains an electrolyte and the other two sheets contain electrochemical species which may be in an anodic or a cathodic state depending upon whether the battery is discharging or is being charged.

A secondary battery is most simply defined as a battery which can be recharged. This recharge capability is due to the incorporation, within the battery, of electrochemical reactants which undergo a highly reversible electrochemical reaction to convert chemical energy to electrical energy upon discharge of the battery. Recharging of the battery converts electrical energy to chemical energy. The electrochemical reactants can be identified as electrochemical species having either an anodic or cathodic state depending upon whether the battery is in the discharge or the recharge mode. The anodic state is identified with the oxidation half of the electrochemical reaction, while the cathodic state is identified with the reduction half of the electrochemical reaction.

During the discharge mode, the battery acts as a voltage device in which the difference in the electrochemical potential between its anodic electrochemical species and its cathodic electrochemical species serves as a driving force to supply electrons through a load connected to the battery. The electrons produced by oxidation of the anodic electrochemical species pass from the battery's positive electrode, through the load and on to the battery's negative electrode. The battery's negative electrode is in association with the cathodic electrochemical species. The acceptance of electrons by the negative electrode results in reduction of the cathodic electrochemical species. When the potential difference between the battery's electrodes approaches zero volts, the source of electrons is substantially exhausted and the battery needs to be recharged.

During the recharge mode, the secondary battery behaves as an electrolysis device in which electrical energy is applied to the battery to provide the necessary electrons to convert the applied electrical energy into stored chemical energy. The electrochemical species, which was anodic and served as a source of electrons during discharge, becomes cathodic during recharge and accepts electrons. The electrochemical species which was cathodic during discharge becomes anodic during recharge. Although the roles of the battery's electrodes, i.e., the acceptance or the discharge of electrons, depends upon whether the battery is in the recharge or discharge mode, the positive electrode is always connected to the positive lead of the load. Similarly, the negative electrode is always connected to the negative lead.

Common secondary batteries are the alkaline and lead-acid batteries. These two types of batteries usually provide rigid cases in which the electrochemical species are contained. Due to the requirements of the materials of construction, these batteries can have considerable thicknesses and weights. This is especially true of the lead-acid battery.

In an attempt to reduce the dimensions of secondary batteries, recent battery research has turned to the use of polymeric films in secondary batteries. See European Patent Application No. 84107618.5, June 30, 1984. The use of polymeric films can provide batteries having very thin cross-sections and decreased weight.

It is therefore an object of this invention to provide a novel secondary battery which incorporates the utilization of polymeric films and which, as a result, has a very thin cross-section even when constructed of a plurality of cells. It is also an object of this invention to provide a secondary battery which has substantial flexibility.

The Invention

This invention relates to a secondary battery comprised of three polymer films. Two of the polymer films are (1) ionically conductive and (2) electronically conductive, i.e., they readily transmit electrons under both the battery's discharge voltage and its recharge voltage. For the purposes of this invention, the electron conduction of these two films should be greater than $10^{-5}$ $(ohm\text{-}cm)^{-1}$. The third polymer film is essentially electronically non-conductive under the battery's discharge voltage, but is electronically conductive under its recharge voltage. This non-conductance is generally below $10^{-6}(ohm\text{-}cm)^{-1}$. The third polymer film is also ionically conductive.

One of the two electronically conductive polymer films contains an electrochemical species which is reduced when the battery is being discharged and oxidized when the battery is being charged. The other electronically conductive polymer film contains an electrochemical species which is oxidized when the battery is being discharged and reduced when the battery is being charged. Both electrochemical species contribute to the ionic conductance of these two films.

To facilitate the collection of the electrons produced by the battery during discharge and the application of a recharge voltage to the electronically conductive polymer films during recharge, it is preferred that the secondary battery of this invention additionally include two electronically conductive collector plates. These plates are generally of graphite, plastic/graphite composites or metal and, if of metal, are preferably of the same metal. By having both collector plates of the same metal, electrolytic interaction between the plates is avoided. Metal collector plates are preferably aluminum, copper, brass, platinum, silver or gold. So that the secondary battery of this invention can have maximum flexibility, these collector plates are preferably provided as metal foils. The collector plates can also be provided as films which are applied to the outside surfaces of the two electronically conductive polymer films by vacuum or electro deposition.

In a preferred form, the secondary battery of this invention is in the form of a laminate of the above-mentioned polymer films and collector plates. This laminate is constructed so that the third polymer film is captured between the two electrically conductive polymer films. Laminated to or deposited on the outside surfaces of the electronically conductive polymer films are the collector plates. The resultant laminate can be held together mechanically or by adhesion. The adhesion can be provided by the lamina themselves or by an adhesive. The use of an adhesive requires that the adhesive be selected so that its electron and ionic conductivity does not interfere with the operation of the secondary battery.

It is preferred that the two electronically conductive polymer films each comprise: a polymer; an agent to render the polymer electronically conductive; a plasticizer for the polymer; and, as an anodic/cathodic electrochemical species, a salt disassociatingly solubilized in the plasticizer.

For most polymer films, it is necessary to use an agent for rendering them electronically conductive. The agent can be applied by doping the polymer film or incorporating therewithin graphite, finely divided carbon or other electronically conductive species. Doping of and the introduction of graphite, carbon, etc., into polymer films is well known in the art and the principles of such are applicable in the instant case.

The salt used in one of the polymer films has the formula $MX_a$, while the salt used in the other polymer film has the formula $M'X_b$. To provide the needed electromotive force between these two polymer films, the $M'$ or the $X_b$ constituent of the $M'X_b$ salt has an electrode potential less than M. Both M and M' are cations while X is an anion and a and b are the oxidation numbers of M or M'. The cations M and M' preferably have a Pauling's electronegativity less than that of the anion X by at least 0.3 units. Generally, such differences in electronegativities protend suitable solubilities of the salt in the plasticizer constituent of the polymer film. Preferred $MX_a$ and $M'X_b$ salts are those in which M and M' are independently selected from: alkali metal ions; alkaline earth metal ions; zinc ion; copper ion; mercury ion; and silver ion; and in which X is a halogen, e.g., $Cl^-$ and $I^-$ or an organic radical, e.g. $(O_2C_2H_3)^-$. Especially useful $MX_a$ and $M'X_b$ salts are $CaI_2$, $ZnCl_2$, $CaCl_2$, $CuCl_2$, $Zn(O_2C_2H_3)_2$, $BaI_2$, $LiI$ and $ZnI_2$. The most preferred pairings of $MX_a$ and $M'X_b$ are: $CaI_2$ and $CaI_2$; $CuCl_2$ and $ZnCl_2$; $LiI$ and $ZnCl_2$.

It is desirable to maximize the amount of salt which can be uniformly distributed within the polymer film. The maximization of the salt concentration is dependent upon the solubility of the salt in the plasticizer and upon the amount of plasticizer which can be used with the polymer without deleteriously affecting the latter's properties. Salt concentrations in the plasticizer within the range of from about 5% to about 30% of total salt saturation are deemed adequate to excellent for the purposes of this invention. Besides the plasticizer being a good salt solvent, it has to also maintain its plasticizing function. It is preferred that the plasticizer be highly compatible with and be able to maintain a continuous phase throughout the polymer.

Preferred plasticizers which exhibit good solubility for the salts of this invention and which maintain their plasticizer function are exemplified by alkyl ether esters of: benzoic acid; terephthalic acid; phthalic acid; and adipic acid. The most highly preferred plasticizer is an ether ester of terephthalic acid having the formula:

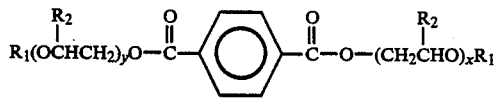

wherein $R_1$ is a phenyl radical or aliphatic hydrocarbon radical of the formula $C_nH_m$ wherein n is an integer of 1 through 8 inclusive and m is equal to $2n+1$; $R_2$ is either hydrogen or a methyl radical; x is 2, 3 or 4; and y is 2, 3 or 4. As a general rule, x and y will be equal. Satisfactory results are obtained, however, irrespective of whether x equals y. The most preferred of such ether esters is di(triethylene glycol butyl ether)terephthalate. When this particular terephthalate is utilized, it is preferably present in each of the electronically conductive polymer films in an amount within the range of from about 5 to about 50 weight percent based upon the total weight of the polymer, the plasticizer and the salt in the film. These ether esters may be prepared in accordance with the procedure disclosed in U.S. Pat. No. 4,620,026.

Preferred salt/plasticizer combinations are those in which the salt is $ZnCl_2$, $CaI_2$, $CuCl_2$, or $LiI$ and the plasticizer is di(triethylene glycol butylether)terephthalate.

The third polymer film comprises: a polymer; a plasticizer for the polymer; and an electrolyte for the battery. The electrolyte is disassociatingly solubilized in the plasticizer. Thus, when the plasticizer is blended into the polymer to provide a homogeneous blend, the solubilized electrolyte is likewise uniformly distributed within the polymer. The electrolyte provides the third polymer's ionic conductivity and its electron conductivity, the latter being at recharge voltages. The electrolyte can be any conventional electrolyte which is soluble in the plasticizer constituent of the third polymer film and which does not deleteriously affect the polymer film properties or the plasticizing function of the plasticizer. Especially suitable electrolytes are alkali metal tetraphenylborates and thiocyanates. Most preferred of these are sodium tetraphenylborate and lithium and sodium thiocyanate. Since these electrolyte are salts, their concentrations in the third polymer film should not be so high that the third polymer film is rendered electronically conductive under the discharge voltage of the battery. For example, it has been found that, when sodium tetraphenylborate is the electrolyte, di(triethylene glycol butylether)terephthalate is the plasticizer, poly(vinyl chloride) is the polymer, and the film thickness is within the range of from about 2 to about 20 mils, the sodium tetraphenylborate is preferably present in an amount of about 1 weight percent based upon the total weight of the polymer film. Sodium tetraphenylborate amounts above about 7 weight percent generally render the third polymer film so electronically conductive that a short will occur between the electronically conductive polymer films, thus rendering the secondary battery of little use.

The plasticizer utilized in the third polymer film may be any one of the plasticizers hereinabove described for the two electronically conductive polymer films. The same criteria are applied in selecting the preferred plasticizer for the third polymer film as were applied for the two electronically conductive polymer films, i.e., the plasticizer must exhibit good solubility for the particular salt to be dissolved therein and must maintain its plasticizer function with respect to the polymer within which it is incorporated. As is the case for the two electronically conductive films, the preferred plasticizer for the third polymer film is di(triethylene glycol butyl ether)terephthalate. In this instance, the amount of plasticizer used should be within the range of from about 5 to about 40 weight percent based upon the total weight of the polymer, the plasticizer and the electrolyte in the film.

The polymer constituent of the three polymer films can be any polymer which can be formed into a film and which does not deleteriously affect the functioning of the electrochemical species and the electrolyte and their uniform distribution throughout the polymer film. Suitable polymers are poly(vinyl chloride), polyurethane, polystyrene, chlorinated polyethylene, poly(vinylidene chloride) and poly(ethylene terephthalate). Both poly(vinyl chloride) and polyurethane are highly preferred.

Polyurethane is especially preferred as it possesses adhesive qualities which will allow it to make good electrical contact with the collector plates. The polymer films can have a thickness within the range of from about 2 to about 20 mils. The thinner polymer films, i.e., those polymer films having a thickness of from about 0.001 to about 0.1 mils, are preferred as these films are more conducive to electronic and ionic conductivity. Further, the thinner films allow for the construction of multicell batteries having a total thickness which is sufficiently small so that flexibility of the battery is still provided.

The three polymer films may each additionally contain various art-recognized stabilizers and processing aids. For example, epoxidized vegetable oil, such as, epoxidized soybean oil, may be incorporated into the polymer formulation as a stabilizer. Solvent, such as, dimethylformamide, tetrahydrofuran and dipropylene glycol methyl ether acetate, may be used when manufacturing the films of this invention by the solvent casting method. When other methods of film formation are used, other applicable conventional processing aids may be used so long as such do not interfere with the functions described for the three films of this invention.

The polymer films of this invention are generally produced in a conventional manner, however, it is important that the $MX_a$, $M'X_b$ and electrolyte salts be added to the plasticizer and not vice versa. By adding the salt to the plasticizer, higher solubilities for the salt can be obtained and the formation of salt aggregates is avoided and thus, the $MX_a$, $M'X_b$ salts and the electrolyte salt are substantially uniformly distributed within their respective films. It has been found that if the plasticizer is added to the salt, the resultant solution gives poor performance when incorporated into the polymer films of this invention.

These and other features of this invention contributing to satisfaction in use and economy in manufacture will be more fully understood from the following description of a preferred embodiment of the invention when taken in connection with the accompanying drawings in which identical numerals refer to identical parts and in which.

Figure 1:
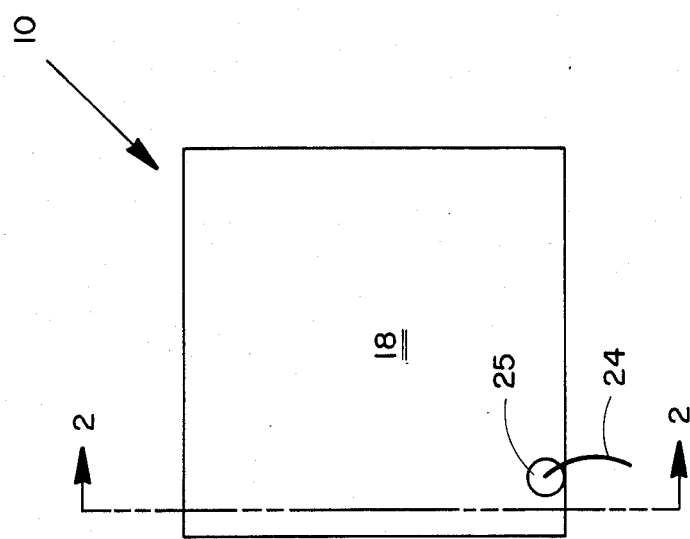
FIG. 1 is a side elevational view of a secondary battery of this invention.
Figure 2:
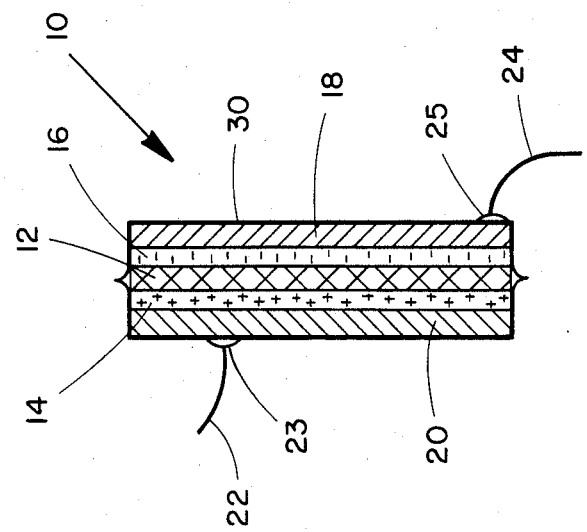
FIG. 2 is a sectional view taken through section lines 2—2 in FIG. 1.

Referring now to FIGS. 1 and 2, there can be seen a secondary battery of this invention, generally designated by the numeral 10. Secondary battery 10 is a laminate of three polymer films 12, 14 and 16 and two collector plates 18 and 20. As can be seen in FIG. 2, polymer film 12 is between polymer films 14 and 16 which are in turn between collector plates 18 and 20.

Polymer film 12 is ionically conductive, not electronically conductive at the battery discharge voltage and electronically conductive at the battery recharge voltage. Polymer film 12 contains a substantially uniform distribution of an electrolyte which has been solubilized in a plasticizer.

Polymer films 14 and 16 are ionically conductive and are electronically conductive at both the battery's discharge and recharge voltage. This electronic conductivity can be achieved by incorporating within polymer films 14 and 16 an electronically conductive species such as graphite or carbon. Polymer film 14 contains a substantially uniform distribution of an electrochemical species which is anodic in character when battery 10 is being discharged and is cathodic in character when battery 10 is being recharged. Polymer film 16 contains a substantially uniform distribution of an electrochemical species which is cathodic in character when battery 10 is being discharged and is anodic in character when battery 10 is being recharged. The uniform distribution of these electrochemical species within polymer films 14 and 16 is achieved by dissolving the electrochemical species in a plasticizer which in turn is incorporated into the films. The composition of polymer films 14 and 16 is in accordance with the prior discussed compositions of the electronically conductive polymer films.

The outer laminae of the laminate comprising battery 10 are two metallic collector plates 18 and 20. As beforenoted, it is preferred that collector plates 18 and 20 be of the same metal and that they be of the metal foil type so that secondary battery 10 will be flexible. The flexibility of secondary battery 10 preferably approaches the same flexibility possessed by polymer films having a thickness equal to the thickness of secondary battery 10.

For the battery shown in the drawings, it can be seen that all of the laminae are coextensive with one another. Attached to points on the outside surfaces of collectors 18 and 20 are, respectively, wire leads 24 and 22. These two wire leads may be connected to the collector plates by any conventional means. For the embodiment shown in the drawings, the leads are connected to the collectors by means of solder welds 25 andd 23.

To assure high fidelity in performance, it is necessary that the various laminae of secondary battery 10 be urged into intimate contact with one another. For the embodiment shown in the drawings, this intimate contact is achieved by inserting the battery within envelope 30 which is suitably at ambient temperature and of a heat shrink film material. When envelope 30 is heated to a temperature of from about 70 to about 100° C., it contracts and thereby urges the various laminae into intimate contact with one another. Heating for a period of about 5 minutes is sufficient. If the battery is very thin, pressure may be applied to the envelope/battery combination during heating to prevent warping. Other methods for ensuring intimate contact between the laminae include the utilization of adhesives and pressure to bind the laminae together or the use of a frame to mechanically urge the laminae into intimate contact.

It should be noted that FIG. 1 and FIG. 2 are not to scale with respect to one another. So that the various laminae can be distinctly seen, the cross-sectional view shown by FIG. 2 has been expanded widthwise. In actuality, the thickness of battery 10 is much narrower in accordance with the thin polymer films and collector plates actually used.

A feature of the secondary battery of this invention is that elevated temperatures are not required to achieve useful discharge voltages, but rather that the subject batteries can be conveniently discharged and recharged at ambient temperatures, e.g., 77° F. (25° C.).

EXAMPLE 1

A first electronically conductive polymer film was prepared as follows:

A 25 wt. % lithium iodide solution was prepared by adding lithium iodide to di(triethylene glycol butyl ether)terephthalate.

One hundred parts by weight of dispersion grade poly(vinyl chloride) was added to 20 parts by weight epoxidized soybean oil and 33 parts by weight dipropylene glycol methyl ether acetate solvent with mixing. After a substantially homogeneous mix was obtained, 105 parts by weight of 1 micron particle size graphite powder was added thereto with mixing. Then, to this mix was added the di(triethylene glycol butyl ether)-terephthalate 25 wt. % lithium iodide solution with further mixing. The resultant mixture was poured onto a smooth glass plate and a "doctor blade" was used to render a film of about 15 mils thickness. The film was cured in an air blown oven for 15 to 20 minutes at about 125° C.

A second electronically conductive film was prepared in the same manner as was the first, except that, instead of lithium chloride, zinc chloride was used.

An ionically conductive film was prepared by the following procedure. A di(triethylene glycol butyl ether)terephthalate 1 wt. % sodium tetraphenylborate solution was prepared by adding the salt to di(triethylene glycol butyl ether)terephthalate with heating (30° C.) and stirring.

Under mixing, 100 parts by weight of dispersion grade poly(vinyl chloride) was added to 20 parts by weight epoxidized soybean oil and 33 parts by weight dipropylene glycol methyl ether acetate. A homogeneous mix was obtained. To this resultant mixture, the di(triethylene glycol butyl ether)terephthalate 1 wt. % sodium tetraphenylborate solution was added with mixing. This last mix was poured onto a smooth glass plate and reduced to a thickness of about 15 mil with a "doctor blade". The film was cured in an air blown oven for 15 to 20 minutes at about 125° C.

A laminate was then formed to provide a battery. The laminate consisted of: a first, generally square, 9 in$^2$, brass plate of about 2 mils thickness; a coextensive layer of the first electronically conductive polymer; a coextensive layer of the ionically conductive polymer; a coextensive layer of the second electronically conductive polymer; and a second, generally square, 9 in$^2$, brass plate of about 2 mils thickness. The laminae were then mechanically pressed together between two plates of nonconductive material, e.g., plexiglass. An anode lead was connected to the first brass plate and a cathode lead was connected to the second brass plate.

A constant 400 mA, variable voltage DC charging current was applied to the cathode. The voltage varied from 2 volts to 100 volts and was varied to maintain the constant 400 mA value during charging. The initial charge period was 8 hours. Subsequent charge periods took only about 5 hours. The charge battery was discharged through a 10,000 ohm resistor. The discharge voltage was 1.5 volts, the discharge amperage was 200 microamps and the discharge time was 8 hours.

EXAMPLE 2

The same procedure was followed as in Example 1 except that aluminum plates were used instead of brass plates. The resultant charged battery was discharged through a 10,000 ohm resistor and the discharge voltage was 1.5 volts and the discharge amperage was 200 microamps. The discharge time was 8 hours. Thus, no difference was seen between using brass or aluminum plates.

EXAMPLE 3

The procedure of Example 1 was followed except that instead of di(triethylene glycol butyl ether)terephthalate 25 wt. % lithium iodide solution, a di(triethylene glycol butyl ether)terephthalate 25 wt. % copper chloride solution was used.

The battery was discharged through a 10,000 ohm resistor. Discharge voltage was 1 volt while the discharge amperage was 16 microamps. Discharge time was 4 hours.

EXAMPLE 4

The same procedure that was used in Example 3 was followed except that the brass plates were substituted with platinum plates. The discharge values through a 10,000 ohm resistor were essentially the same. Thus, there is little difference seen between the use of brass or platinum plates.

EXAMPLE 5

The same procedure that was used in Example 1 was followed except that a di(triethylene glycol butyl ether)terephthalate 25 wt. % calcium iodide solution was substituted for both the di(triethylene glycol butyl ether)terephthalate 25 wt. % lithium iodide solution and the di(triethylene glycol butyl ether)terephthalate 25 wt. % zinc chloride solution. Discharge through a 10,000 ohm resistor gave a discharge voltage of 3.5 volts and a discharge amperage of 100 microamps. Discharge time was 10 hours.

EXAMPLE 6

The procedure of Example 5 was followed except that aluminum plates were used in place of the brass plates. The discharge values through a 10,000 ohm resistor were essentially identical as those reported in Example 5.

We claim:
1. A secondary battery which comprises:
   (a) an ionically and electronically conductive first polymer film having substantially uniformly distributed therewithin an electrochemical species which contributes to the ionic conductivity of said first polymer film and which is electrochemically reduced when said battery is being discharged and electrochemically oxidized when said battery is being charged;
   (b) an ionically and electronically conductive second polymer film having substantially uniformly distributed therewithin an electrochemical species which contributes to the ionic conductivity of said second polymer film and which is electrochemically oxidized when said battery is being discharged and electrochemically reduced when said battery is being charged; and
   (c) an ionically conductive third polymer film in contact with said first and said second polymer films, said third polymer film comprising,
      (i) a polymer,
      (ii) a plasticizer for said polymer, and
      (iii) an electrolyte for said battery, which electrolyte is disassociatingly solubilized in said plasticizer, said plasticizer and the solubilized electrolyte being substantially uniformly distributed within said polymer, said ionically conductive third polymer film being substantially electronically non-conductive under discharging voltages and electronically conductive under charging voltages.
2. The secondary battery of claim 1 wherein said secondary battery additionally comprises a first collector plate in contact with said first polymer film and a second collector plate in contact with said second polymer film.

3. The secondary battery of claim 2 wherein said first and second plates are of metal.

4. The secondary battery of claim 1 wherein said first polymer film comprises:
a polymer;
an agent for rendering said first polymer film electronically conductive;
a plasticizer for said polymer; and
a salt dissassociatingly solubilized in said plasticizer, said salt having the formula $MX_a$ wherein,
M is an alkali metal ion, an alkaline earth metal ion, a zinc ion, a copper ion, a mercury ion or a silver ion,
X is a halogen ion or an acetate ion, and
a is the oxidation number of M,
and wherein said second polymer film comprises:
a polymer;
an agent for rendering said second polymer film electronically conductive;
a plasticizer for said polymer; and
a salt disassociatingly solubilized in said plasticizer, said salt having a constituent with an electrode potential less than M and having the formula $M'X_b$ wherein,
M' is an alkali metal ion, an alkaline earth metal ion, a zinc ion, a copper ion, a mercury ion or a silver ion,
X is a halogen ion or an acetate ion, and
b is the oxidation number of M'.

5. The secondary battery of claim 4 wherein $MX_a$ is $CuCl_2$ and $M'X_b$ is $ZnCl_2$.

6. The secondary battery of claim 4 wherein $MX_a$ is $LiI$ and $M'X_b$ is $ZnCl_2$.

7. The secondary battery of claim 4 wherein $MX_a$ and $M'X_b$ are both $CaI_2$.

8. The secondary battery of claim 1 wherein said plasticizer in said first and second polymer films is an alkyl ether ester of an acid independently selected for said first and second polymer films from the group consisting of benzoic acid, terephthalic acid, phthalic acid, adipic acid and mixtures thereof.

9. The secondary battery of claim 1 wherein said plasticizer in said first and second polymer film is an alkyl ether ester of terephthalic acid having the formula:

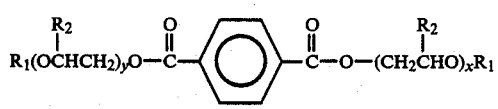

wherein $R_1$ is a phenyl radical or aliphatic hydrocarbon radical of the formula $C_nH_m$ wherein n is an integer of 1 through 8 inclusive and m is equal to $2n+1$; $R_2$ is either hydrogen or a methyl radical; x is 2, 3 or 4; and y is 2, 3 or 4.

10. The secondary battery of claim 9 wherein said plasticizer in said first and second polymer films is di(triethylene glycol butyl ether)terephthalate.

11. The secondary battery of claim 10 wherein said plasticizer is present in said first and second polymer films in an amount within the range of from about 5 to about 50 weight percent based upon the total weight of said polymer, said plasticizer and said salt in each of said films.

12. The secondary battery of claim 1 wherein said plasticizer in said third polymer film is an alkyl ether ester of an acid selected from benzoic acid, terephthalic acid, phthalic acid, adipic acid and mixtures thereof.

13. The secondary battery of claim 12 wherein said plasticizer in said third polymer film is an alkyl ether ester of terephthalic acid having the formula:

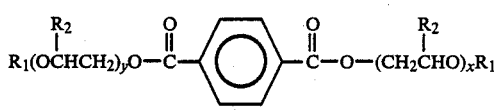

wherein $R_1$ is a phenyl radical or aliphatic hydrocarbon radical of the formula $C_nH_m$ wherein n is an integer of 1 through 8 inclusive and m is equal to $2n+1$; $R_2$ is either hydrogen or methyl radical; x is 2, 3 or 4; and y is 2, 3 or 4.

14. The secondary battery of claim 13 wherein said plasticizer in said third polymer film is di(triethylene glycol butyl ether)terephthalate.

15. The secondary battery of claim 14 wherein said plasticizer in said third polymer film is present in an amount within the rangee of from about 5 to about 40 weight percent based upon the total weight of said polymer, said plasticizer and said electrolyte in said film.

16. The secondary battery of claim 4 wherein said polymer of said first, second and third polymer films is independently selected from the group consisting of poly(vinyl chloride), polyurethane, polystyrene, chlorinated polyethylene, poly(vinylidene chloride) and poly(ethylene terephthalate).

17. The secondary battery of claim 16 wherein said polymer of said first, second and third polymer films is poly(vinyl chloride).

18. The secondary battery of claim 16 wherein said polymer of said first and second polymer films is polyurethane.

19. The secondary battery of claim 1 wherein said electrolyte is selected from the group consisting of sodium tetraphenylborate and alkali metal thiocyanates.

20. The secondary battery of claim 1 wherein said electrolyte is sodium tetraphenylborate and is present in an amount of about 1 weight percent based upon the total weight of said polymer, said plasticizer and said electrolyte in said film.

* * * * *